United States Patent
Ideshio et al.

(10) Patent No.: US 8,401,749 B2
(45) Date of Patent: Mar. 19, 2013

(54) VEHICLE GEAR SHIFT CONTROL DEVICE AND GEAR SHIFT CONTROL METHOD

(75) Inventors: Yukihiko Ideshio, Nissin (JP); Shigeru Okuwaki, Gotemba (JP); Hiroyuki Shibata, Susono (JP); Tomohito Ono, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 301 days.

(21) Appl. No.: 12/996,263

(22) PCT Filed: Jun. 2, 2009

(86) PCT No.: PCT/IB2009/005818
§ 371 (c)(1),
(2), (4) Date: Dec. 3, 2010

(87) PCT Pub. No.: WO2009/147502
PCT Pub. Date: Dec. 10, 2009

(65) Prior Publication Data
US 2011/0093173 A1 Apr. 21, 2011

(30) Foreign Application Priority Data
Jun. 3, 2008 (JP) .................................. 2008-145678

(51) Int. Cl.
*G06F 7/00* (2006.01)
(52) U.S. Cl. ........................................... 701/55; 477/15
(58) Field of Classification Search .................... 701/51, 701/55; 477/15, 73, 107, 110
See application file for complete search history.

(56) References Cited

U.S. PATENT DOCUMENTS

| | | | |
|---|---|---|---|
| 4,732,055 A | 3/1988 | Tateno et al. | |
| 5,772,556 A | 6/1998 | Tinschert et al. | |
| 6,496,767 B1 | 12/2002 | Lorentz | |
| 2003/0203790 A1 | 10/2003 | Matsubara et al. | |
| 2005/0209046 A1* | 9/2005 | Potter | 477/115 |
| 2007/0208478 A1* | 9/2007 | Takamatsu | 701/53 |
| 2008/0195286 A1* | 8/2008 | Tabata et al. | 701/51 |
| 2011/0015033 A1* | 1/2011 | Nonomura et al. | 477/37 |
| 2011/0015838 A1* | 1/2011 | Takahashi et al. | 701/55 |

(Continued)

FOREIGN PATENT DOCUMENTS

| | | |
|---|---|---|
| EP | 1 356 980 | 10/2003 |
| JP | 63 270961 | 11/1988 |

(Continued)

OTHER PUBLICATIONS

International Search Report issued Sep. 14, 2009 in PCT/IB09/005818 filed Jun. 2, 2009.

(Continued)

*Primary Examiner* — Helal A Algahaim
(74) *Attorney, Agent, or Firm* — Oblon, Spivak, McClelland, Maier & Neustadt, L.L.P.

(57) ABSTRACT

In a gear shift control device for a vehicle that shifts a transmission having a plurality of gears based on a shift line set in a shift map, an upshift line for shifting to the highest gear, and a downshift line that is located in a high vehicle speed region on the side of a higher vehicle speed than the upshift line are set in the shift map. The downshift line is used when shifting from the highest gear to a prescribed gear that has a larger gear ratio than the highest gear.

16 Claims, 4 Drawing Sheets

U.S. PATENT DOCUMENTS

2011/0015839 A1* 1/2011 Takahashi et al. .............. 701/55
2011/0130934 A1* 6/2011 Kumazaki et al. .............. 701/69

FOREIGN PATENT DOCUMENTS

| | | |
|---|---|---|
| JP | 63 270962 | 11/1988 |
| JP | 02 046354 | 2/1990 |
| JP | 03 041254 | 4/1991 |
| JP | 03 121365 | 5/1991 |
| JP | 04 244661 | 9/1992 |
| JP | 05 106726 | 4/1993 |
| JP | 06 193721 | 7/1994 |
| JP | 07 239015 | 9/1995 |
| JP | 08 014377 | 1/1996 |
| JP | 11 218216 | 8/1999 |
| JP | 2003 322249 | 11/2003 |

OTHER PUBLICATIONS

Office Action issued Apr. 9, 2010, in Japanese Patent Application No. 2008-145678, filed Jun. 3, 2008 (with English language translation).

\* cited by examiner

VEHICLE GEAR SHIFT CONTROL DEVICE AND GEAR SHIFT CONTROL METHOD

BACKGROUND OF THE INVENTION

1. Field of the Invention

The invention relates to a vehicle gear shift control device and a gear shift control method applied to a transmission that is provided in a vehicle equipped with an internal combustion engine and is configured to be capable of shifting a plurality of gears having mutually different gear ratios.

2. Description of the Related Art

A conventional vehicle gear shift control device controls an automatic transmission having six forward gears based on shift maps in which shift lines are set for each shift pattern of the gears (see, for example, Japanese Patent Application Publication No. 2003-322249 (JP-A-2003-322249)).

In the drive device of JP-A-2003-322249, in the case of having set the smallest sixth gear of a gear ratio (rotating speed of the input shaft of a transmission/rotating speed of the output shaft of a transmission) to an even smaller gear ratio in order to improve fuel efficiency, at high speeds exceeding the vehicle speed suitable for the sixth gear, the operating point intersecting with the optimum engine line is located at a lower gear than the sixth gear. Consequently, an optimum gear ratio that improves fuel efficiency is not attained by the sixth gear at such high speeds, thereby resulting in the possibility of degrading fuel efficiency if the transmission continues to operate in the sixth gear.

SUMMARY OF THE INVENTION

The invention provides a vehicle speed change control device capable of inhibiting deterioration of fuel efficiency at high vehicle speeds exceeding a vehicle speed suitable for a speed change gear having the highest speed change ratio.

In a first aspect thereof, the invention relates to a gear shift control device for a vehicle equipped with an internal combustion engine, that is applied to a transmission that is provided in the vehicle and is configured to be capable of shifting a plurality of gears having mutually different gear ratios. The gear shift control device is provided with a memory unit for storing a shift map, which is defined by the vehicle speed and the load of the internal combustion engine, and in which shift lines are set for each shift pattern of the gears; and a control unit for controlling the transmission based on the shift lines set in the shift map so that shift patterns of the gears are implemented in accordance with an operating state of the vehicle, wherein a first shift line that is used for implementing a shifting pattern for shifting to a highest gear having the smallest gear ratio, and a second shift line that is located at a higher vehicle speed than the first shift line, and that is used for implementing a shift pattern for shifting from the highest gear to a prescribed gear having a gear ratio larger than the highest gear, are respectively set in the shift map, and wherein the second shift line that is composed of a first high vehicle speed-high load portion where the vehicle speed is equal to or greater than a first prescribed vehicle speed, and where the load is equal to or greater than a first prescribed load; a first low vehicle speed-low load portion where the vehicle speed is equal to or less than a second prescribed vehicle speed which is below the first prescribed vehicle speed, and where the load is equal to or less than a second prescribed load which is below the first prescribed load; and a first intermediate portion located between the first high vehicle speed-high load portion and the first low vehicle speed-low load portion.

According to this gear shift control device, in the case where the vehicle speed of a vehicle and the load of an internal combustion engine have changed in the manner of crossing the second shiftline after having been shifted to the highest gear based on the first shift line, a prescribed gear is shifted to having a large gear ratio. As a result, the internal combustion engine equipped on the vehicle avoids a low rotating speed-high load operating state and shifts to a high rotating speed-low load operating state. Thus, deterioration of fuel efficiency resulting from a highest gear being maintained at high vehicle speeds can be inhibited.

In the first aspect of the vehicle gear shift control device, the second shift line may be configured so that shifting to the prescribed gear based on the second shift line is inhibited or prohibited in the case where the load of the internal combustion engine exceeds a first prescribed load. In the case where shifting to a prescribed gear based on the second shift line is not inhibited or prohibited in the case where acceleration is continued even after having shifted to the highest gear in the state in which the load has exceeded the first prescribed load, there is the possibility of deterioration of both fuel efficiency and driveability. According to this aspect, since shifting to a prescribed gear based on the second shift line is inhibited or prohibited in such a case and unnecessary gear shifting can be inhibited or prohibited, it is possible to realize both improvement of fuel efficiency and inhibition or prohibition of deterioration of driveability. In this aspect, the second shift line may be such that the first high vehicle speed, high load portion extends toward the high vehicle speed side. In this case, shifting to a prescribed gear based on the second shift line can be inhibited in regions exceeding the first prescribed vehicle speed and exceeding the first prescribed load. In this aspect, the second shift line may be such that the load of the first high vehicle speed, high load portion is set to the first prescribed load. In this case, shifting to a prescribed gear based on the second shift line can be prohibited in regions exceeding the first prescribed vehicle speed and regions exceeding the first prescribed load.

In the first aspect of the vehicle control device, the second shift line may be configured so that shifting to the prescribed gear based on the second shift line is inhibited or prohibited in the case where the vehicle speed is below a second prescribed vehicle speed. According to this aspect, since shifting to the prescribed gear is inhibited or prohibited in the case where the vehicle speed is below the second prescribed vehicle speed, by setting the second prescribed vehicle speed to a lower limit of vehicle speed at which improvement of fuel efficiency can be expected, unnecessary downshifting can be prevented and both improvement of fuel efficiency and inhibition or prohibition of deterioration of driveability can be realized. In this aspect, the second shift line may be such that the first low vehicle speed-low load portion extends toward the low load side. In this case, shifting to a prescribed gear based on the second shift line can be inhibited in regions below the second prescribed vehicle speed and below the second prescribed load. In this aspect, the second shift line may be such that the vehicle speed of the first low vehicle speed-low load portion is set to the second prescribed vehicle speed. In this case, shifting to a prescribed gear based on the second shift line can be prohibited in regions below the second prescribed vehicle speed and below the second prescribed load.

In the first aspect of the vehicle gear shift control device, a third shift line may be set in the shift map separately from the first shift line, the third shift line being used for realizing a shift pattern for shifting from the prescribed gear to the highest gear after shifting to the prescribed gear based on the second shift line, and being composed of a second high vehicle speed-high load portion with a vehicle speed equal to or greater than a fourth prescribed vehicle speed and with a load equal to or greater than a fourth prescribed load, a second low vehicle speed-low load portion with a vehicle speed equal to or less than a third prescribed vehicle speed lower than the fourth prescribed vehicle speed and with a load equal to or less than a third prescribed load lower than the fourth prescribed load, and a second intermediate portion located between the second high vehicle speed-high load portion and the second low vehicle speed-low load portion. In addition, in this aspect, the third shift line may be such that the second low vehicle speed-low load portion is located between the first shift line and the second shift line. According to this aspect, when vehicle speed decreases as a result of traveling by inertia (namely, during so-called coasting) while the load is maintained on the low load side equal to or less than the third prescribed load after having shifted to a prescribed gear based on the second shift line, shifting from a prescribed gear to the highest gear based on the third shift line is carried out since the third shift line crosses the second low vehicle speed-low load portion. Consequently, the rotating speed of the internal combustion engine can be reduced during coasting. As a result, fuel efficiency can be improved since so-called engine drag torque decreases. In addition, hysteresis is occurred since the second low vehicle speed-low load portion of the third shift line is separated from the second shift line in the direction in which vehicle speed changes. As a result, gear hunting can be prevented when shifting between a prescribed gear and the highest gear. In this aspect, the third shift line is such that the vehicle speed of the second low vehicle speed, low load portion may be set to the third prescribed vehicle speed.

In this aspect, the third shift line may be such that the second high vehicle speed-high load portion extends toward the high vehicle speed side. In this case, when the load has increased after having shifted the gear based on the second shift line, an operating state of the vehicle crosses the second high vehicle speed-high load portion of the third shift line, and the transmission is shifted from a prescribed gear to the highest gear based on the third shift line. Thus, the engine speed may be decreased more than in the case where a prescribed gear is maintained while the vehicle travels at high speed and under high load. Consequently, excessive rotation of the internal combustion engine at high vehicle speed and high loads can be prevented, and since fuel cutoff carried out during excessive rotation can be avoided by preventing this excessive rotation, deterioration of driveability can be prevented as a result of power performance being secured at high vehicle speeds and high loads. In addition, hysteresis is occurred since the second high vehicle speed-high load portion of the third shift line is separated from the second shift line in the direction in which the load changes. As a result, gear hunting during shifting between a prescribed gear and the highest gear can be prevented. In this aspect, the third shift line may be such that the load of the second high vehicle speed-high load portion is set to the fourth prescribed load.

In addition, the third shift line may be such that the second intermediate portion overlaps the first shift line. In this case, the third shift line and the first shift line share shift map data with respect to the intermediate portion. Consequently, since data of the first shift line can be used when setting the third shift line, development time can be shortened as compared with the case of developing the third shift line independently.

In a second aspect thereof, the invention relates to a vehicle gear shift control device. This vehicle gear shift control device is provided with a memory unit that stores a shift map which is defined by a vehicle speed of the vehicle equipped with an internal combustion engine and a load on the internal combustion engine, and in which shift lines are set for each shift pattern of a plurality of gears having mutually different gear ratios of a transmission provided in the vehicle and configured to be capable of shifting the gears; and a control unit that controls the transmission based on shift lines set in the shift map so that shift patterns of the gears are implemented in accordance with an operating state of the vehicle, wherein a first shift line that is used for implementing a shifting pattern for shifting to a highest gear having the smallest gear ratio, and a second shift line that is located at a higher vehicle speed than the first shift line, and that is used for implementing a shift pattern for shifting from the highest gear to a prescribed gear having a gear ratio larger than the highest gear, are respectively set in the shift map, and wherein the second shift line is composed of a first high vehicle speed-high load portion where the vehicle speed is equal to or greater than a first prescribed vehicle speed, and where the load is equal to or greater than a first prescribed load; a first low vehicle speed-low load portion where the vehicle speed is equal to or less than a second prescribed vehicle speed which is below the first prescribed vehicle speed, and where the load is equal to or less than a second prescribed load which is below the first prescribed load; and a first intermediate portion located between the first high vehicle speed-high load portion and the first low vehicle speed-low load portion.

In a third aspect thereof, the invention relates to a gear shift control method for a vehicle. In this gear shift control method, in a shift map which is defined by the vehicle speed of a vehicle equipped with an internal combustion engine and the load of the internal combustion engine and in which shift lines are set for each shift pattern of a plurality of gears having mutually different gear ratios of a transmission provided in the vehicle and configured to be capable of shifting the gears; the transmission shifts to a highest gear having the smallest gear ratio when an operating state of the vehicle exceeds a first shift line for implementing a shift pattern for shifting to a highest gear in the shift map; and the transmission shifts from the highest gear to a prescribed gear that have a gear ratio larger than the highest gear when the operating state of the vehicle exceeds a second shift line located at a higher vehicle speed than the first shift line after the transmission has shifted to the highest gear in the shift map.

As has been explained above, according to each aspect of the invention, since a second shift line for shifting from a highest gear to a prescribed gear having a gear ratio larger than the highest gear in a region of higher vehicle speeds than a first shift line for shifting to the highest gear is set in a shift map, in the case of having changed the vehicle speed of a vehicle and the load of an internal combustion engine so as to cross the second shift line after having shifted to the highest gear based on the first shift line, the gear is shifted to a prescribed gear having a larger gear ratio than the highest gear. As a result, the internal combustion engine equipped in the vehicle avoids a low rotating speed-high load operating state, and shifts to a high rotating speed-low load operating state. Thus, deterioration of fuel efficiency resulting from the highest gear being maintained a high vehicle speeds can be inhibited.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
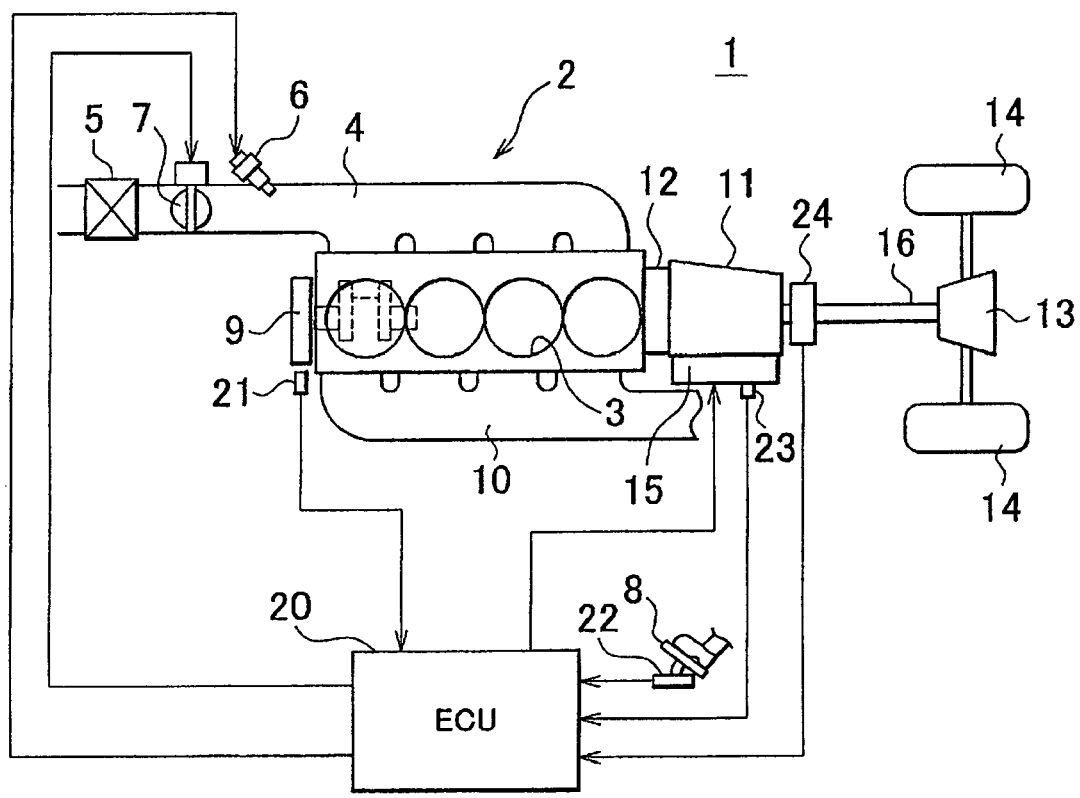
FIG. 1 is a schematic diagram of a vehicle equipped with the gear shift control device according to an embodiment of the invention.

The following provides an explanation of the vehicle gear shift control device according to an embodiment of the invention. As shown in FIG. 1, a vehicle 1 is equipped with a motive power source such as an internal combustion engine 2. The internal combustion engine 2 according to the embodiment is an inline four-cylinder gasoline engine having four cylinders 3 arranged in a row. A fuel-air mixture, composed of a mixture of air filtered through an air filter 5 and fuel injected from a fuel injection valve 6, is introduced to each cylinder 3 through an intake passage 4. The intake air volume of the internal combustion engine 2 is adjusted with a throttle valve 7 provided in the intake passage 4, and the air-fuel ratio of the fuel-air mixture introduced into each cylinder 3 is adjusted to a prescribed air-fuel ratio by injecting the fuel through the fuel injection valve 6 in accordance with the intake air volume. The throttle valve 7 is operated to an opening that corresponds to the operating amount of an accelerator pedal 8 (accelerator depression amount). The fuel-air mixture introduced to each cylinder 3 is ignited by a spark plug not shown, and the resultant torque is output from a crankshaft 9 by the combustion of the fuel-air mixture. Exhaust following combustion in each cylinder 3 is led to an exhaust passage 10, and the exhaust is released into the atmosphere after pollutants in the exhaust have been purified by an exhaust purification device, not shown, provided in the exhaust passage 10.

A transmission 11 having six forward gears and one reverse gear is coupled to the crankshaft 9 of the internal combustion engine 2 via a torque converter 12, and rotation of the crankshaft 9, for which speed has been changed by the transmission 11, is transmitted to left and right drive wheels 14 via a propeller shaft 16 and a differential 13. Although details of the internal structure have been omitted from the drawings, the transmission 11 is equipped with a plurality of planetary gear mechanisms, and a transmission is available that achieves shifting of a plurality of gears by operating a plurality of hydraulic clutches that switch the clamped state of each element of these mechanisms. In order to operate the hydraulic clutch, the transmission 11 includes a hydraulic circuit for realizing each speed change gear. A valve body 15, to which a solenoid valve is attached, and the like is provided at a suitable location in the hydraulic circuit.

The valve body 15 is controlled by an electronic control unit (ECU) 20 that controls the operating state and so forth of the internal combustion engine 2. The ECU 20 is comprised of a computer containing a microprocessor and peripheral devices required for the operation thereof. The peripheral devices are random access memory (RAM), read only memory (ROM), and an input/output interface and so on. Although the ECU 20 is a unit for controlling both the internal combustion engine 2 and the transmission 11, a computer for controlling the internal combustion engine 2 and a computer for controlling the transmission 11 may also be provided separately, and these computers may then be connected by a communication line to impart a function similar to that of the ECU 20.

Various sensors are connected to the ECU 20, and each component of the internal combustion engine 2 and the transmission 11 is controlled based on signals from these sensors. For example, the ECU 20 controls each component of the fuel injection valve 6 and the throttle valve 7 and the like according to a prescribed control program stored in ROM so that operating parameters of air intake volume, fuel injection volume, fuel injection timing and the like are at the proper values. The various sensors connected to the ECU 20 that are not used in embodiments of the invention are omitted from the drawings. Sensors provided in this embodiment include a crank angle sensor 21 for detecting the engine speed of the internal combustion engine 2, an accelerator depression amount sensor 22 for detecting the accelerator depression amount of the accelerator pedal 8, a vehicle speed sensor 23 for detecting the speed of the vehicle 1 (vehicle speed), and a shift position sensor 24 for specifying a current gear of the transmission 11.

Forward gears in the form of first gear, second gear, third gear, fourth gear, fifth gear and sixth gear, are set in steps starting with that having the largest gear ratio (rotating speed of the crankshaft 9/rotating speed of the propeller shaft 16 i.e. rotating speed of transmission input shaft/rotating speed of transmission output shaft). The forward gears and a reverse gear are selectively realized by the transmission 11 being controlled by the ECU 20. The gear ratio of each gear is suitably set according to the performance of the internal combustion engine and the design of the vehicle 1. For example, sixth gear as the highest gear used in the highest vehicle speed range, which has the smallest gear ratio, may be set to a gear ratio suitable for vehicle speeds of about 120 Km/h with the emphasis on fuel economy, and may be composed in the form of an overdrive gear having a gear ratio of 1 or less. Fifth gear is set to have a gear ratio of 1, and the first to fourth gears are composed in the form of underdrive gears.

Shift patterns relating to the forward gears consist of upshifting in the form of first gear→second gear (1→2), second gear→third gear (2→3), third gear→fourth gear (3→4), fourth gear→fifth gear (4→5) and fifth gear→sixth gear (5→6). In addition, downshifting shift patterns consist of sixth gear→fifth gear (6→5), fifth gear→fourth gear (5→4), fourth gear→third gear (4→3), third gear→second gear (3→2) and second gear→first gear (2→1). In this manner, these shift patterns are formed between sequential gears, and upshifting or downshifting is not carried between gears separated by two or more gears.

The ECU 20 controls the transmission 11 to shift gears based on shift lines set in shift maps (shift line drawings) in which shift lines are set for each shift pattern. Shifting gears using such shift maps has been widely used in the past. In general, the shift lines set in the shift maps are defined by parameters representing the load of the internal combustion engine, such as vehicle speed, accelerator depression amount, throttle opening and air intake volume. The data of shift maps are stored in a computer that controls the transmission. The computer monitors the vehicle speed, vehicle load and shift position, detects changes in vehicle speed and load that cross the shift lines set for each shift pattern, and controls the transmission so that the shift pattern defined by a particular shift line is carried out based on the detected changes vehicle speed and vehicle load. In this embodiment as well, the ECU 20 similarly executes shifting of the gears by using shift maps stored in ROM while respectively acquiring the current accelerator depression amount, vehicle speed and gear based on signals from the accelerator depression amount sensor 22, the vehicle speed sensor 23 and the shift position sensor 24. As a result, the ECU 20 functions as a control unit of the invention. This embodiment is characterized by the configuration of shift lines set in shift maps.

Figure 2:
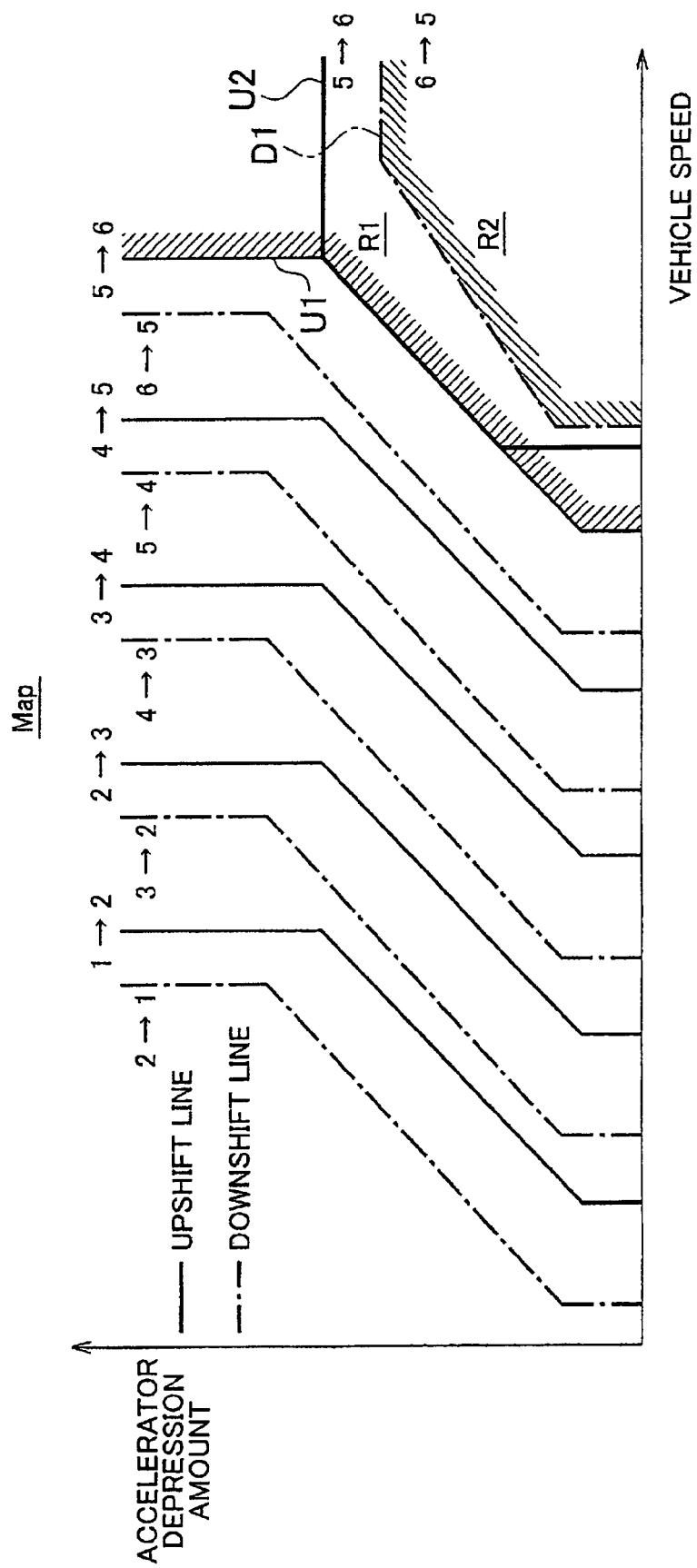
FIG. 2 is a drawing showing a shift map according to an embodiment of the invention.

The shift map of FIG. 2 is stored in a memory unit in the form of the ROM of the ECU 20, and is referred to at appropriate times according to execution of the prescribed control program executed by the ECU 20 for the transmission 11. The shift map is a two-dimensional map in which vehicle speed is plotted on the horizontal axis, the load of the internal combustion engine 2 in the form of an accelerator depression amount is plotted on the vertical axis, and a plurality of shift lines are set corresponding to each shift pattern of the gears. Among these shift lines, shift lines corresponding to upshifts in the form of upshift lines are indicated with solid lines, while shift lines corresponding to downshifts in the form of downshift lines are indicated with single-dot broken lines. As is commonly known, upshift lines and downshift lines between adjacent gears are separated in the direction in which vehicle speed changes, and as a result thereof, hysteresis is occurred that prevents gear hunting when shifting gears. Each shift line is composed so that gears are shifted properly according to the gear ratio of each gear.

As shown in the shift map of FIG. 2, a downshift line D1 for shifting from sixth gear to fifth gear is provided in a high vehicle speed region R1 on the side of a higher vehicle speed than an upshift line U1 for shifting from fifth gear to sixth gear. The upshift line U1 corresponds to the first shift line, while the downshift line D1 corresponds to the second shift line. In the case of gear shift control not provided with a downshift line D1, after having shifted to the highest gear, the highest gear is maintained as long as the vehicle is operated in a region at a higher vehicle speed than the upshift line. In this embodiment, because the downshift line D1 is set in the high vehicle speed region R1 of the shift map, after the transmission has shifted from fifth gear to sixth gear, when vehicle speed has increased and crossed the downshift line D1, the transmission 11 is controlled so that the transmission shifts from sixth gear to fifth gear. In other words, downshifting from sixth gear to fifth gear occurs following an upshift from fifth gear to sixth gear.

Figure 3:
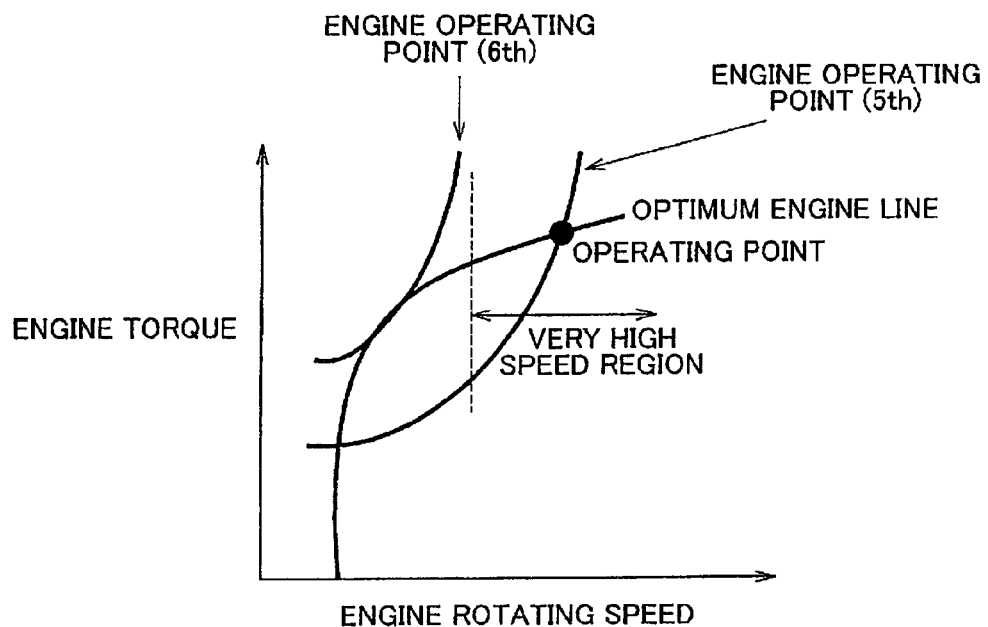
FIG. 3 is an explanatory drawing relating to an embodiment of the invention in which engine torque is plotted on the vertical axis, engine speed is plotted on the horizontal axis, and which respectively indicates an optimum engine line, a sixth gear engine operating line (point), and a fifth gear engine operating line (point)

An explanation of the reason for downshifting in this manner is provided with reference to FIG. 3. As shown in this drawing, because an optimum engine line that the engine is operated optimally is located on the high rotating speed side at very high vehicle speeds of 160 Km/h or more, for example, the engine has an optimum (in terms of good fuel consumption) gear ratio at a lower gear than the gear ratio of the sixth gear suitable for a vehicle speed of about 120 Km/h. Thus, if the vehicle speed increases and enters the very high vehicle speed region while the transmission is in sixth gear, downshifting to fifth gear instead of maintaining sixth gear improves fuel efficiency. In other words, fuel efficiency may be improved because the internal combustion engine 2 equipped in the vehicle 1 avoids a low engine speed-high load operating state as when sixth gear is maintained, and changes to a high engine speed-low load operating state as a result of operating in fifth gear. Consequently, in the shift map of FIG. 2, the downshift line D1 for shifting from sixth gear to fifth gear is provided in the high vehicle speed region R1 on the side of a higher vehicle speed than the upshift line U1 for shifting from fifth gear to sixth gear.

Figure 4:
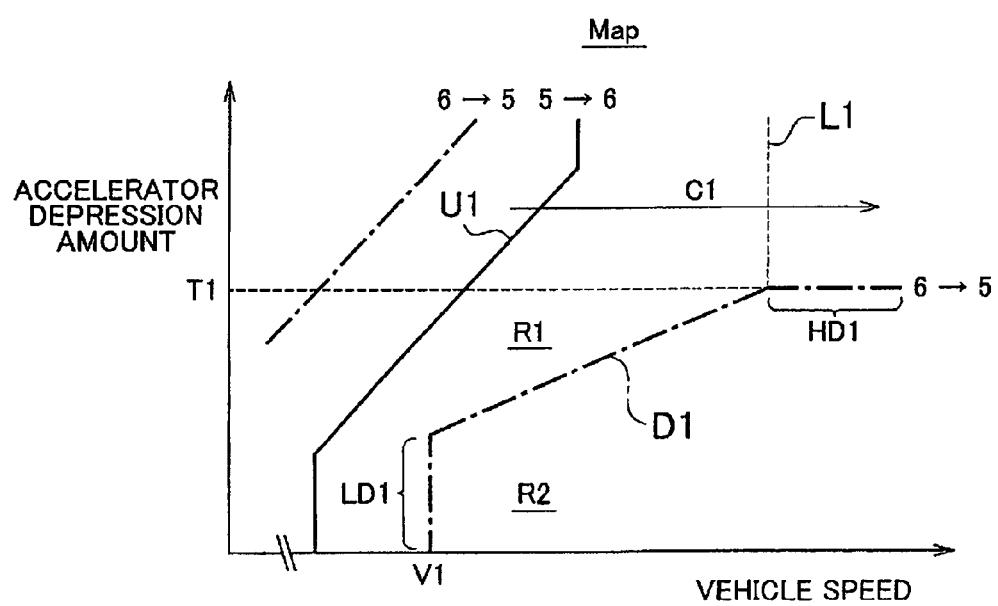
FIG. 4 is an explanatory drawing relating to an embodiment of the invention showing an enlarged view of the vicinity of the downshift line from sixth to fifth gear set in the shift map of FIG. 2.

FIG. 4 is an explanatory drawing depicting an enlarged view of the vicinity of the downshift line D1 set in the shift map of FIG. 2. As shown in FIG. 4, a high vehicle speed-high load portion HD1 of the downshift line D1 extends toward the high vehicle speed side. More specifically, the portion HD1 extends parallel to the horizontal axis, or in other words, extends toward the side of high vehicle speed while the accelerator depression amount remains constant. Consequently, as indicated by arrow C1 in FIG. 4, for example, if the operating state has changed such that the accelerator depression amount exceeds a prescribed opening amount T1 (namely, in the case where the load exceeds a prescribed load) and acceleration continues even after having shifted from fifth gear to sixth gear, downshifting from sixth gear to fifth gear based on the downshift line D1 is prohibited. Furthermore, if the high vehicle speed-high load portion of the second shift line is extending toward the high vehicle speed side, downshifting from sixth gear to fifth gear based on the downshift line D1 is inhibited. Even if the portion HD1 of the downshift line D1 were to be parallel to the vertical axis as indicated by broken line L1, namely extending to the high load side, because the broken line L1 is crossed during the course of the change in the operating state indicated by C1, the transmission downshifts from sixth gear to fifth gear. In this case, there is a possibility that both fuel efficiency and driveability are degraded. Thus, by extending the portion HD1 of the downshift line D1 to the high vehicle speed side as shown in the figure, unnecessary downshifting can be inhibited or prohibited, thereby making it possible to realize both improved fuel efficiency and inhibition or prohibition of deterioration of driveability.

On the other hand, a low vehicle speed-low load portion LD1 of the downshift line D1 extends toward the low load side. Consequently, downshifting from sixth gear to fifth gear based on the downshift line D1 is inhibited. In the figure, portion LD1 extends parallel to the vertical axis. Consequently, if vehicle speed is below a prescribed vehicle speed V1 when the vehicle is under a low load after having shifted to sixth gear, downshifting from sixth gear to fifth gear based on the downshift line D1 is prohibited. The prescribed vehicle speed V1 is set to the lower limit (for example, 160 Km/h) of a vehicle speed region (very high speed region) in which fuel efficiency is improved by downshifting as explained in FIG. 3. Thus, by inhibiting or prohibiting unnecessary downshifts, fuel efficiency is improved and inhibition or prohibition of deterioration of driveability can be realized.

As shown in FIG. 2, in addition to the normal upshift line U1 for shifting from fifth gear to sixth gear, a third shift line in the form of an upshift line U2 is set in the shift map that is used for upshifting from fifth gear to sixth gear after downshifting from sixth gear to fifth gear based on the downshift line D1. As a result of the downshift line D1 being set at a higher vehicle speed than the upshift line U1, an imbalance may occur in control between a state in which the gear has been downshifted to fifth gear while crossing the downshift line D1 and a state in which the gear has been upshifted to sixth gear while crossing the upshift line U1. In order to prevent this imbalance, a dedicated upshift line U2 is set in the shift map for upshifting from fifth gear to sixth gear after a downshift carried out in accordance with the downshift line D1. In order to distinguish between the case of upshifting to fifth gear while crossing the downshift line D1 and the case of upshifting to sixth gear while crossing the upshift line U1, the shift control program stored in the ECU 20 includes a region R2 set to the side of a higher vehicle speed than the downshift line D1, and the upshift line U2 is used after having entered that region R2.

Figure 5:
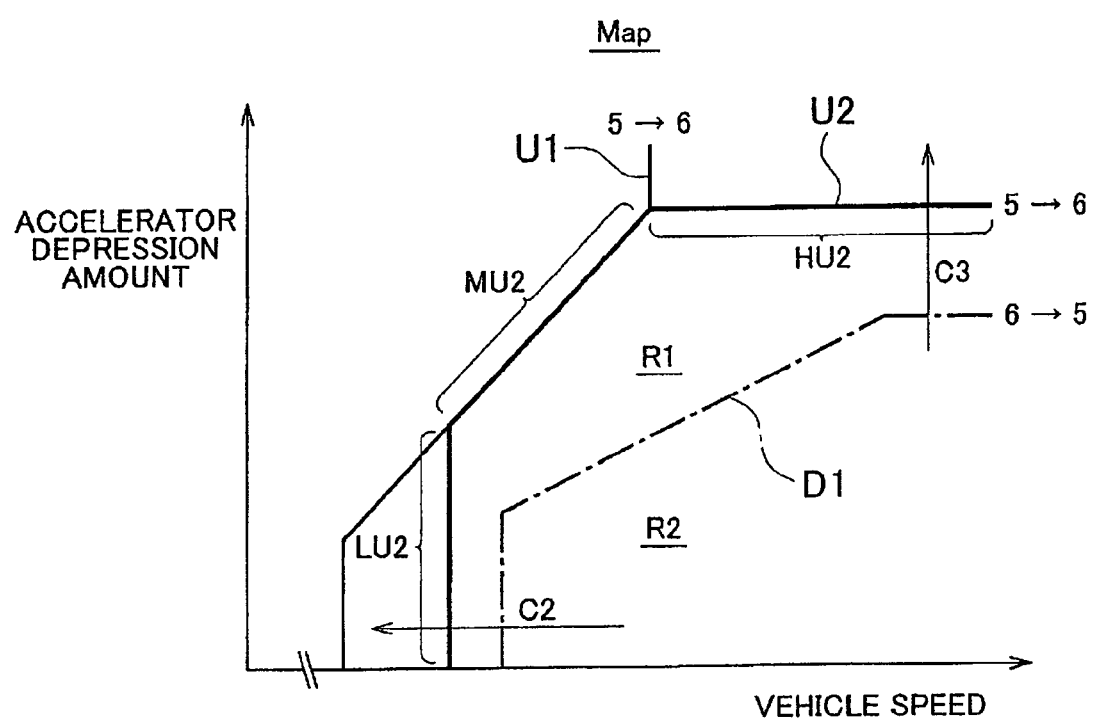
FIG. 5 is an explanatory drawing relating to an embodiment of the invention showing an enlarged view of the vicinity of the upshift line from fifth to sixth gear set in the shift map of FIG. 2.

FIG. 5 is an explanatory drawing depicting an enlarged view of the vicinity of the upshift line U2 set in the shift map of FIG. 2. As shown in FIG. 5, a low vehicle speed-low load portion LU2 of the upshift line U2 extends to the low load side, and the portion LU2 is located between the normal upshift line U1 and downshift line D1. When vehicle speed decreases as a result of traveling by inertia (namely, during so-called coasting) while the accelerator depression amount is maintained on the closed side as indicated by arrow C2 after having downshifted to the fifth gear based on the downshift line D1, because vehicle speed crosses the portion LU2 on the low vehicle speed-low load side of the upshift line U2, the shift gear is upshifted from fifth gear to sixth gear. Consequently, the engine speed when coasting is reduced. As a result, it is possible to improve fuel efficiency because so-called engine drag torque decreases. In addition, hysteresis is occurred because the portion LU2 of the upshift line U2 is separated from the downshift line D1 in the direction in which vehicle speed changes. As a result, gear hunting may be prevented when controlling the shift between fifth gear and sixth gear.

In addition, the portion HU2 on the high vehicle speed-high load side of the upshift line U2 extends toward the high vehicle speed side. More specifically, the portion HU2 extends parallel to the horizontal axis. In other words, the portion HU2 extends toward the high vehicle speed side while the accelerator depression amount remains constant. Consequently, as indicated by arrow C3, if the accelerator depression amount increases after the transmission has downshifted in accordance with the downshift line D1, the operating state crosses the portion HU2 of the upshift line U2, and the transmission upshifts from fifth gear to sixth gear based on the upshift line U2. Thus, the engine speed of the internal combustion engine 2 can be reduced in comparison with the case where the fifth gear is maintained when the vehicle is traveling at high speed and under high load. Consequently, excessive rotation of the internal combustion engine 2 in a high vehicle speed-high load region can be prevented, and because fuel cutoff carried out during excessive rotation is avoided by preventing this excessive rotation, deterioration of driveability is prevented as a result of securing power performance in the high vehicle speed-high load region. In addition, hysteresis is occurred since the portion HU2 of the upshift line U2 is separated from the downshift line D1 in the direction in which load changes (direction in which the accelerator depression amount changes). As a result, gear hunting is prevented when controlling the shift between fifth gear and sixth gear.

Furthermore, an intermediate portion MU2 of the upshift line 132, located between the portion HU2 and the portion LU2, overlaps the upshift line U1. In other words, shift map data is shared between the upshift line U2 and the upshift line U1 with respect to the intermediate portion MU2. Consequently, because data of the upshift line U1 may be used when setting the upshift line U2, development time may be shortened as compared with the case of developing the upshift line U2 independently. In addition, hysteresis is occurred because the intermediate portion MU2 is also separated from the downshift line D1, thereby making it possible to prevent gear hunting when controlling the shift between fifth gear and sixth gear.

The invention is not limited to embodiment described above, but rather may be implemented in various forms within the scope of the invention. For example, there are no limitations on the number of transmission speeds, and the number of speeds may be four forward gears or five forward gears. In addition, when shifting between gears separated by two or more gears, the current gear may be shifted to a prescribed gear having a speed change ratio two gears lower than the highest speed change gear after having shifted to the highest speed change gear, for example.

In addition, the transmission is not limited to transmission that are connected to an internal combustion engine through a so-called torque converter and composed by combining planetary gear mechanisms, but rather may also be a so-called twin clutch transmission. Instead, any transmission that selectively realize a plurality of speeds may be used.

In addition, the motive power source for vehicle operation is not limited to only an internal combustion engine. Namely, this embodiment may also be applied to a transmission provided in a so-called hybrid vehicle equipped with an electric motor for the motive power source for vehicle operation in addition to an internal combustion engine.

The shift map shown is merely intended to visually represent the data configuration of a shift map retained by the ECU 20, and is not intended to mean that the depicted graph is retained in the ECU 20. Thus, the invention may also implemented by using shift maps provided with a data configuration that brings about the same results as the shift map shown in the drawing. In addition, although the map shown in the drawing uses accelerator depression amount as the physical quantity representing a load, the shift map may also use the opening of a throttle valve or air intake volume as the physical quantity representing the load. In addition, in if the internal combustion engine equipped with the invention is a diesel engine, the fuel injection volume may also be used as the physical quantity representing the load.

The invention claimed is:

1. A gear shift control device for a vehicle, comprising:
a memory unit that stores a shift map which is defined by a vehicle speed of the vehicle equipped with an internal combustion engine and a load on the internal combustion engine, and in which shift lines are set for each shift pattern of a plurality of gears having mutually different gear ratios of a transmission provided in the vehicle and configured to be capable of shifting the gears; and
a control unit that controls the transmission based on shift lines set in the shift map so that shift patterns of the gears are implemented in accordance with an operating state of the vehicle,
wherein a first shift line that is used for implementing a shifting pattern for shifting to a highest gear having the smallest gear ratio, and
a second shift line that is located at a higher vehicle speed than the first shift line, and that is used for implementing a shift pattern for shifting from the highest gear to a prescribed gear having a gear ratio larger than the highest gear,
are respectively set in the shift map,
and wherein the second shift line is composed of a first high vehicle speed-high load portion where the vehicle speed is equal to or greater than a first prescribed vehicle speed, and where the load is equal to or greater than a first prescribed load; a first low vehicle speed-low load portion where the vehicle speed is equal to or less than a second prescribed vehicle speed which is below the first prescribed vehicle speed, and where the load is equal to or less than a second prescribed load which is below the first prescribed load; and a first intermediate portion located between the first high vehicle speed-high load portion and the first low vehicle speed-low load portion.

2. The gear shift control device according to claim 1, wherein
the second shift line is configured so that shifting to the prescribed gear based on the second shift line is inhibited if the load of the internal combustion engine exceeds the first prescribed load.

3. The gear shift control device according to claim 2, wherein
the second shift line is set such that the first high vehicle speed-high load portion extends toward the high vehicle speed side.

4. The gear shift control device according to claim 1, wherein
the second shift line is configured so that shifting to the prescribed gear based on the second shift line is inhibited if the vehicle speed is below the second prescribed vehicle speed.

5. The gear change control device according to claim 4, wherein
the second shift line is set such that the first low vehicle speed-low load portion extends toward the low load side.

6. The gear shift control device according to claim 1, wherein
the second shift line is configured so that shifting to the prescribed gear based on the second shift line is prohibited if the load on the internal combustion engine exceeds the first prescribed load.

7. The gear shift control device according to claim 6, wherein
the second shift line is set such that the load of the first high vehicle speed-high load portion is set to the first prescribed load.

8. The gear shift control device according to claim 1, wherein
the second shift line is configured so that shifting to the prescribed gear based on the second shift line is prohibited if the vehicle speed is below the second prescribed vehicle speed.

9. The gear shift control device according to claim 8, wherein
the second shift line is set such that the vehicle speed of the first low vehicle speed-low load portion is set to the second prescribed vehicle speed.

10. The gear shift control device according to claim 1, wherein
a third shift line is set in the shift map separately from the first shift line, and used for implementing a shift pattern for shifting from the prescribed gear to the highest gear after the transmission has shifted to the prescribed gear based on the second shift line, and
wherein the third shift line is composed of a second high vehicle speed-high load portion where the vehicle speed is equal to or greater than a fourth prescribed vehicle speed and where the load is equal to or greater than a fourth prescribed load; a second low vehicle speed-low load portion where the vehicle speed is equal to or less than a third prescribed vehicle speed which is below the fourth prescribed vehicle speed, and where the load is equal to or less than a third prescribed load which is below the fourth prescribed load; and a second intermediate portion located between the second high vehicle speed-high load portion and the second low vehicle speed-low load portion.

11. The gear shift control device according to claim 10, wherein
the third shift line is set such that the second low vehicle speed, low load portion is located between the first shift line and the second shift line.

12. The gear shift control device according to claim 11, wherein
the third shift line is set such that the vehicle speed of the second low vehicle speed-low load portion is set to the third prescribed vehicle speed.

13. The gear shift control device according to claim 10, wherein
the third shift line is set such that the second high vehicle speed-high load portion extends toward the high vehicle speed side.

14. The gear shift control device according to claim 13, wherein
the third shift line is set such that the load of the second high vehicle speed-high load portion is set to the fourth prescribed load.

15. The gear shift control device according to claim 10, wherein
the third shift line is set such that the second intermediate portion overlaps the first shift line.

16. A gear shift control method for a vehicle, comprising, with the use of a shift map which is defined by the vehicle speed of a vehicle equipped with an internal combustion engine and the load of the internal combustion engine and in which shift lines are set for each shift pattern of a plurality of gears having mutually different gear ratios of a transmission provided in the vehicle and configured to be capable of shifting the gears:
shifting, using a gear shift control device, to a highest gear having the smallest gear ratio when an operating state of the vehicle exceeds a first shift line for implementing a shift pattern for shifting to the highest gear in the shift map; and
shifting from the highest gear to a prescribed gear that have a gear ratio larger than the highest gear when the operating state of the vehicle exceeds a second shift line located at a higher vehicle speed than the first shift line in the shift map after the transmission has shifted to the highest gear.

* * * * *